E. KARI.
SAFETY LOCK FOR BRAKE SHOES.
APPLICATION FILED DEC. 18, 1916.
1,229,281.
Patented June 12, 1917
2 SHEETS—SHEET 2.
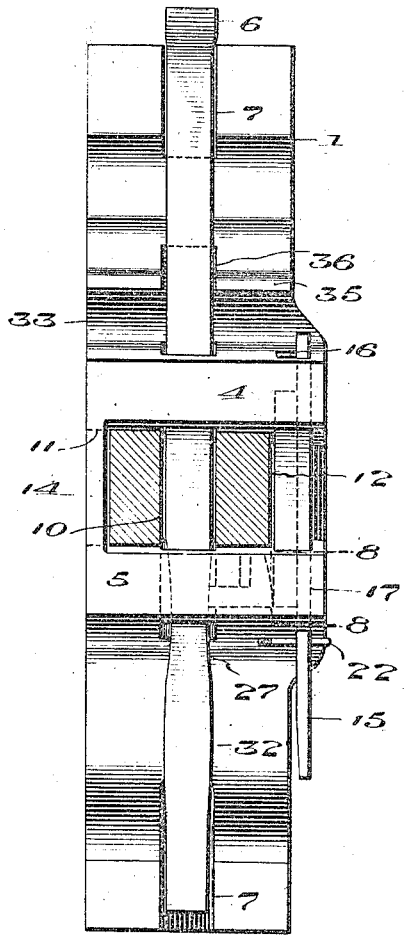
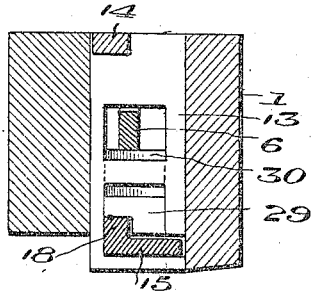
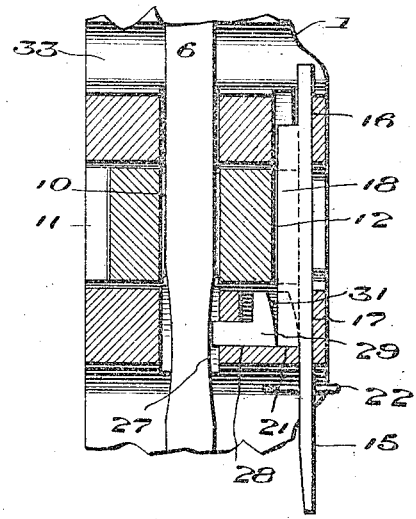

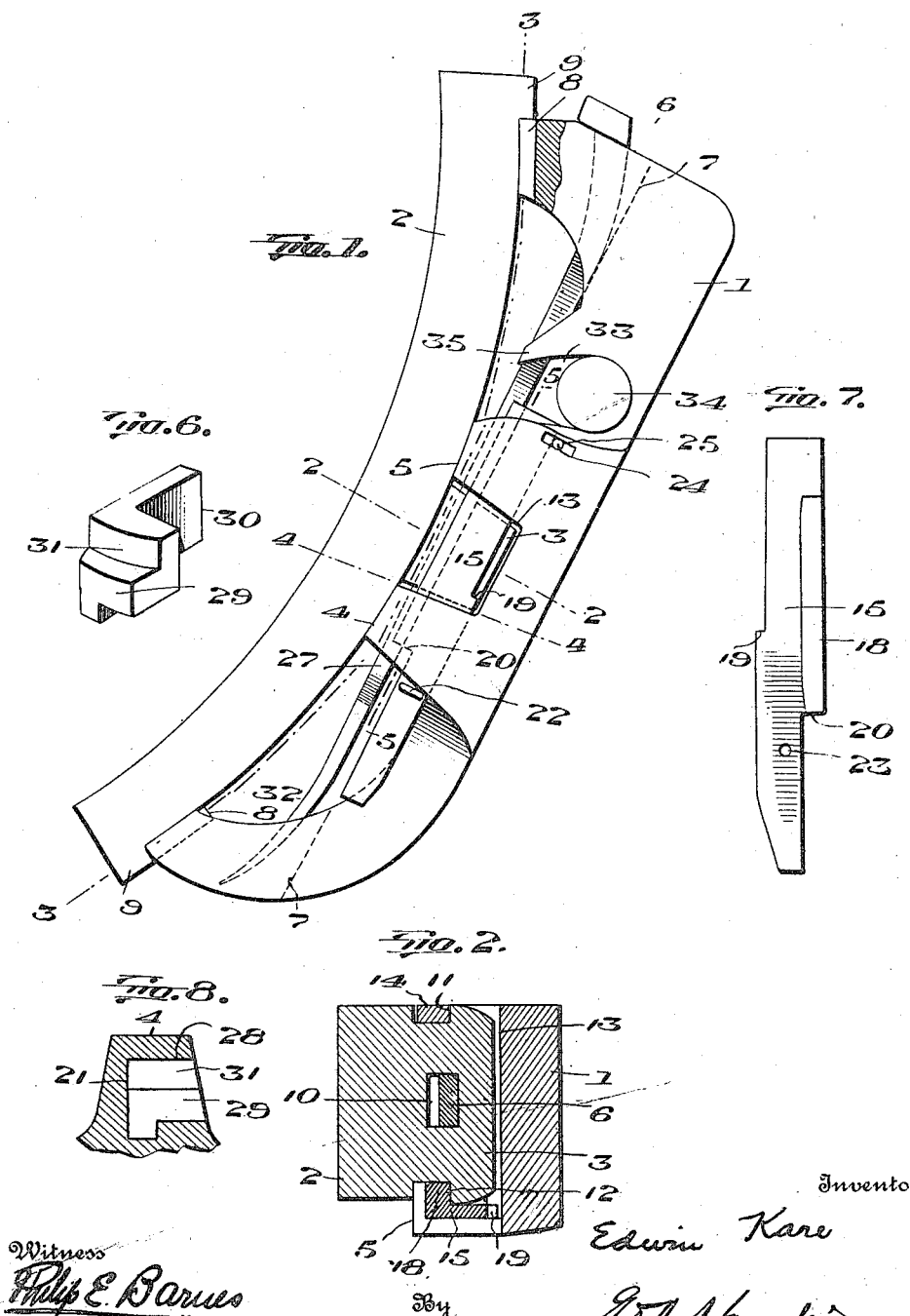

UNITED STATES PATENT OFFICE.

EDWIN KARI, OF SUPERIOR, WISCONSIN.

SAFETY-LOCK FOR BRAKE-SHOES.

1,229,281.  Specification of Letters Patent.  Patented June 12, 1917.

Application filed December 18, 1916. Serial No. 137,632.

*To all whom it may concern:*

Be it known that I, EDWIN KARI, a citizen of the United States, residing at Superior, county of Douglas, and State of Wisconsin, have invented certain new and useful Improvements in Safety-Locks for Brake-Shoes, of which the following is a specification.

This invention relates to locks for securing brake shoes to brake heads.

The ordinary brake shoe and brake head used on railway cars are connected together by a key which is readily removed and is also liable to become accidentally detached. Through accidental detachment or malicious removal of these keys, very large numbers of brake shoes become detached, resulting in heavy loss and dangerous impairment of the braking capacity of cars.

My invention overcomes accidental detachment of the brake shoe from the brake head and the malicious removal of the usual locking key by the provision of a novel safety lock which is adapted, first, to constitute a supplemental locking key for securing the key-lug in the brake shoe and, second, constituting an inter-locking means with the main key.

My invention may be carried out in either of the above mentioned ways and, except where limited in the claims to the inter-locking of the safety key and the main key, the invention is comprehended by the improved supplemental or safety locking key only.

Preferably the improvements embody the interlocking of the main key with the supplemental or safety key as there is thereby obtained the added advantage of a double lock between the brake shoe and brake head and accidental detachment of the two is absolutely prevented. Likewise, with the interlocking of the two keys, the danger of detachment of the shoe from the head by an unauthorized person is minimized.

Another feature of my invention is the provision of improved means for engagement with the brake hanger whereby the latter is prevented from slipping in between the brake shoe and brake head and causing them to separate or break apart, under the pressure. This construction embodies a peculiar slot and lip on the brake head.

The invention is susceptible of modification and the disclosure hereinafter given is to be considered as illustrative, rather than restrictive, of the scope of the invention.

The accompanying drawings show the invention embodied in a construction where the safety or supplemental key not only locks the key-lug of the shoe but also interlocks with the main locking key which secures the key-lug to the brake head but my invention is to be understood, also, as comprehending the improved safety locking key alone, without the interlocking feature.

In the accompanying drawings:

Figure 1 is a side elevation, partly broken away;

Fig. 2, a cross section on line 2—2, Fig. 1;

Fig. 3, a longitudinal section on line 3—3, Fig. 1;

Fig. 4, a cross section on line 4—4, Fig. 1;

Fig. 5, a detail longitudinal section on line 5—5, Fig. 1;

Fig. 6, a detail of the interlocking block;

Fig. 7, a detail of the safety key; and

Fig. 8, a detail section on line 8—8, Fig. 3.

The brake head is shown at 1, the brake shoe at 2, the key-lug at 3, the bridges at 4 and 5, and the main locking key at 6.

The brake head 1 is slotted at 7 to receive the key 6 and to engage the lugs 8 on the shoe 2. The flanges 9 engage the ends of the head 1 in the usual manner.

The key-lug 3 has an opening 10 for the reception of the main locking key 6 and has ledges or shoulders 11 and 12.

The brake head 1 has a socket 13 adapted to receive the key-lug 3. When in this position, the ledge or shoulder 11 engages the cross-bridge 14 and the key 6 passes through the opening 10 and under the bridges 4 and 5.

Should the key 6 jar loose or be removed, the brake shoe 2 would at once fall out, were it not for the provision of the present improvements.

To prevent accidental and unwarranted detachment of the brake shoe 2 I provide a slidable supplemental safety key or locking device 15 which is slidable in slots 16 and 17 beneath the bridges 4 and 5 and has a flange or shoulder 18 which overhangs the socket 13 and is adapted to engage the shoulder or flange 12. The flange 18 is of such a length that when the key 15 is in locked position, said flange 18 lies underneath the bridges 4 and 5 which thereupon constitute abutments for said flange and said key 15 to form a firm lock. The key 15 has shoulders 19 and 20, the former being on its lower edge and the latter constituting the end of the flange 18. When the key 15 is in its locked position, with the flange 18 under the bridges 4 and 5, the shoulder 20 abuts a shoulder 21 in the pillar under the bridge 4. When in that position, a spring key or cotter 22 is passed through an opening 23 in the key 15 and abuts against the pillar of the bridge 4 thereby locking the key against release. The spring cotter 22 can be spread sufficiently, with a suitable tool inserted between the head 1 and shoe 2, to prevent it from being pulled out by an unauthorized person. A second spring cotter 24 is entered through a hole 25 in the pillar which supports the bridge 5 and may be driven inwardly and bent so that said cotter cannot be easily removed. The cotter 24 serves as an abutment for the shoulder 19 when the key 15 is slid upwardly to disengage the flange 18 from the shoulder 12.

From the foregoing construction it will be seen that even though the key 6 becomes accidentally or purposely removed, nevertheless the brake shoe 2 will be firmly held by the parts 11, 12, 14 and 18.

My invention is complete as thus far described but I preferably employ further improvements constituting an interlock between the keys 15 and 6 as now described.

The key 6 is provided with a contracted portion 27. In the pillar underneath the bridge 4 is a chamber 28 constituting a lateral extension of the opening 16. Slidable in the chamber 28 is an interlocking block 29, which has an extension 30 whose inner end is adapted, when projected, to bear against the contracted part 27 of the key 6, thereby locking the latter so that it cannot be removed. This locking action occurs when the key 15 is seated with its flange 18 under the bridges 4 and 5. When thus closed, the inner face of the key 15 bears against the edge 31 of the interlocking block 29 and the edge of the flange 18 bears against the cam or inclined face 31 of said block, thus holding the block 29 in interlocked condition. When the key 15 is released, the key 6 can be withdrawn as the end portion 32 thereof wipes against the block 29 and moves it sidewise. In seating the key 15 the shoulder 20 first engages the cam surface 31, pressing the block 29 laterally, and finally abuts the part 21.

As thus improved, the locking lug 3 is fastened by the bridge 14, flange 18, and key 6, with the added interlocking of the keys 6 and 15.

Extending across the inner face of the brake head 1 is a groove 33 which has an arc-shaped wall and receives the brake hanger 34. A common defect heretofore has been that the brake hanger is liable to work between the brake head and the brake shoe and loosen the latter or pry it off of the brake head, causing it to fall on the track, due to the pressure. Projecting from the brake head is a lip or flange 35 whose end face constitutes a continuation of the wall of the channel or groove 33 and, in effect, overhangs the groove. This lip may have a notch 36 to loosely receive the key 6. The form of the groove 33 and the provision of the lip 35 prevents the brake hanger from working between the brake head 1 and the shoe 2, thereby obviating the aforementioned defect.

Having thus described my invention, what I claim as new and desire to secure by Letters Patent, is:

1. In a safety lock for brake shoes, the combination with a brake head, of a brake shoe having a key lug adapted to engage the brake head, a main locking key for securing the key lug to the brake head, and a supplemental or safety key carried by the brake head and adapted to engage the key lug.

2. In a safety lock for brake shoes, the combination with a brake head, of a brake shoe having a key lug adapted to engage the brake head, a main locking key for securing the key lug to the brake head, a supplemental or safety key carried by the brake head and adapted to engage the key lug, and means for interlocking the main and safety keys.

3. In a safety lock for brake shoes, the combination with a brake head, of a brake shoe having a key lug adapted to engage the brake head, a main locking key for securing the key lug to the brake head, a supplemental or safety key carried by the brake head and adapted to engage the key lug, and a movable interlocking device operated by the safety key lock adapted to hold the main key against removal.

4. In a safety lock for brake shoes, the combination with a brake head, of a brake shoe having a key lug adapted to engage the brake head, a main locking key for securing the key lug to the brake head, and a safety locking key, movable independently of the main key, which is adapted to engage or release the key lug and to hold the latter independently of the main key.

5. In a safety lock for brake shoes, the combination with a brake head having main bridges and a cross bridge, there being a socket intermediate the main bridges, of a main locking key, a supplemental or safety locking key, and a brake shoe having a key lug adapted to be received in the socket aforesaid and to be engaged and locked by the cross bridge, the main key, and the safety key.

6. In a safety lock for brake shoes, the combination with a brake head having main bridges and a cross bridge, there being a socket intermediate the main bridges, of a main locking key, a supplemental or safety locking key, a brake shoe having a key lug adapted to be received in the socket aforesaid and to be engaged and locked by the cross bridge, the main key, and the safety key, and an interlock for securing the main key against removal when the safety key is in locked engagement with the key lug.

7. In a safety lock for brake shoes, the combination with a brake head having main bridges and a cross bridge, there being a socket intermediate the main bridges, of a main locking key, a supplemental or safety locking key, a brake shoe having a key lug adapted to be received in the socket aforesaid and to be engaged and locked by the cross bridge, the main key, and the safety key, and a slidable interlocking block or member adapted to be moved into locked engagement with the main key by the act of locking the safety key and to be maintained in such locked engagement while the safety key remains locked.

In testimony whereof, I hereunto affix my signature.

EDWIN KARI.